Nov. 29, 1932.   W. C. ANTHONY   1,889,520
DUMPING BODY
Filed March 27, 1931   2 Sheets-Sheet 1

Inventor
William C. Anthony
by Parker & Carter
Attorneys.

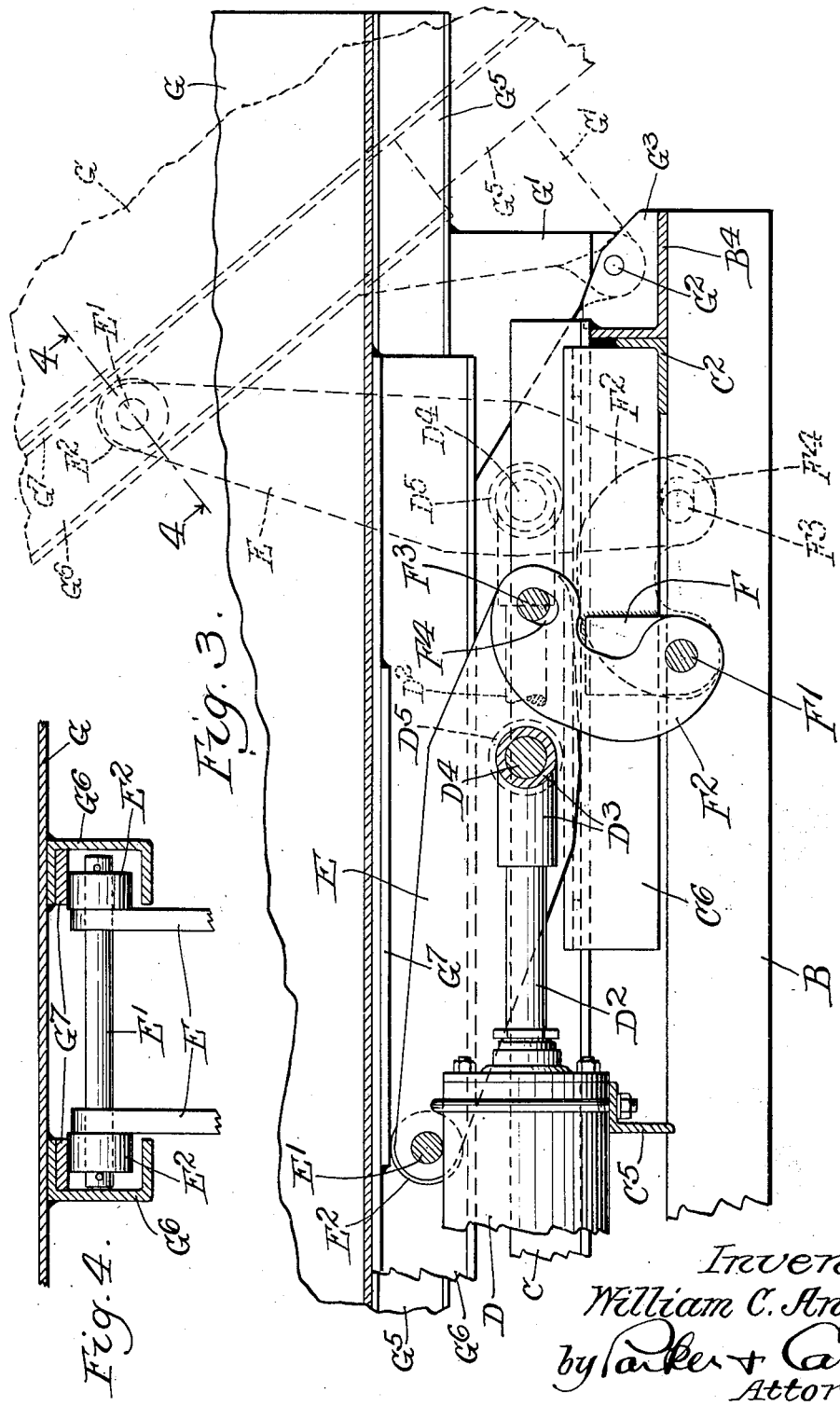

Patented Nov. 29, 1932

1,889,520

UNITED STATES PATENT OFFICE

WILLIAM C. ANTHONY, OF STREATOR, ILLINOIS, ASSIGNOR TO ANTHONY COMPANY, OF STREATOR, ILLINOIS, A CORPORATION OF ILLINOIS

DUMPING BODY

Application filed March 27, 1931. Serial No. 525,714.

This invention relates to dumping bodies, particularly to dumping receptacles and means for dumping them, adapted to be mounted on vehicles.

One object of the invention is to provide means for tipping the body for dumping, with a simple mechanism.

Another object is to provide a system of levers adapted to be operated by hydraulic means and to dump the body and to return it after dumping.

Other objects will appear from time to time in the specification and claims.

My invention is illustrated more or less diagrammatically in the accompanying drawings, wherein:—

Figure 3 is a longitudinal vertical sectional detail, on an enlarged scale, showing the dumping levers and their operating mechanism;

Figure 4 is a transverse vertical cross sectional detail taken at line 4—4 of Figure 3.

Like parts are designated by like characters throughout the specification and drawings.

A indicates the ground or other surface upon which the vehicle stands and moves.

Figure 2:
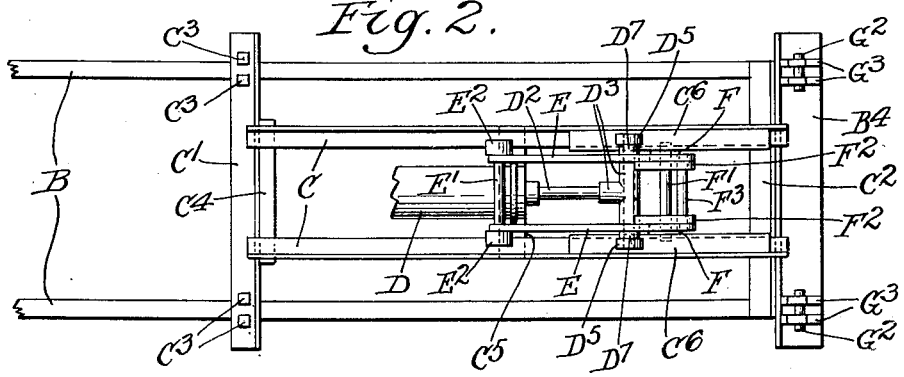
Figure 2 is a plan view of the frame and a portion of the dumping mechanism, with the body removed.

B is an automobile frame having side members as indicated in Figure 2. $B^1$ is a driver's seat, $B^2$ an axle, which may be supported in any suitable manner, and $B^3$ a wheel. The details of the vehicle form no part of the present invention and are, therefore, not illustrated fully.

The frame is provided with a suitable number of cross frame members such as a rear frame member $B^4$. A sub-frame construction to carry the drumping body and its mechanism is preferably used. It may include side members C, C, which for some purposes serve as tracks and are joined to a forward cross member $C^1$ and a rear cross member $C^2$. The cross member $C^1$ rests upon the vehicle frame members B and may be bolted to them by bolts $C^3$, or may, in any other suitable manner, be fastened to them. A cross frame reinforcing member $C^4$ may be used. An intermediate cross frame member $C^5$ may be fastened to the frame and serves to support a portion of an hydraulic mechanism of which only the cylinder is shown. Track portions $C^6$ $C^6$ are mounted on the side frame members C and serve to strengthen the frame and to carry the wear of moving parts which move along them.

D is an hydraulic cylinder which may be of any suitable design and operated by any suitable mechanism. The details of its construction and those of the pumping or other operating mechanism form no part of the present invention. They are, therefore, omitted. A piston $D^1$ moves in the cylinder D. A rod $D^2$ is attached to the position and projects outside of the cylinder. It may carry a cross member $D^3$ forming a cross head within which is positioned a shaft $D^4$, upon each end of which rollers $D^5$ are positioned. These rollers are mounted to run on the track members $C^6$. $D^7$ $D^7$ are spacing sleeves on the shaft $D^4$.

Pivoted intermediate their ends on the shaft $D^4$ are preferably two levers E. These levers may at their upper ends carry a shaft $E^1$ which extends across between them and which carries at its outer end rollers $E^2$.

Fixed upon suitable supports F, preferably supported from the sub-frame members C, is a cross shaft $F^1$. Two curved or "kidney" shaped links $F^2$ are positioned, one on each end of the shaft $F^1$. At their upper ends the links $F^2$ engage a shaft $F^3$ which extends across between the levers E. At their lower ends the links $F^2$ are provided with circular perforations. At their upper ends they are provided with slots $F^4$. These slots are sufficiently long to provide a definite sliding movement in addition to the rotating movement which occurs as the parts are moved.

G is a dumping body or receptacle of any suitable size. It is provided in its rear with downwardly depending brackets $G^1$ which are supported for rotation on short shafts $G^2$ which are themselves mounted in ears $G^3$, which are fixed to the cross frame member B⁴. The receptacle may carry a reinforcing frame G⁵ of any suitable design and preferably in addition carries inwardly facing channel or track members G⁶ within which the rollers E² are positioned and along which they may move. Wearing plates or reinforcements G⁷ may be added within the channels G⁶ to reinforce and strengthen them. At its rear, or elsewhere, the body may have a dumping gate G⁸ which may be of any suitable design.

H is a support for the forward end of the body. This may be of any suitable design and may or may not embody a latching mechanism.

It will be realized that whereas I have herewith shown and described a practical operative device, nevertheless many changes might be made in the size, shape, number and disposition of parts without departing materially from the spirit of my invention and I wish, therefore, that my showing be taken as in a sense diagrammatic.

Figure 1:
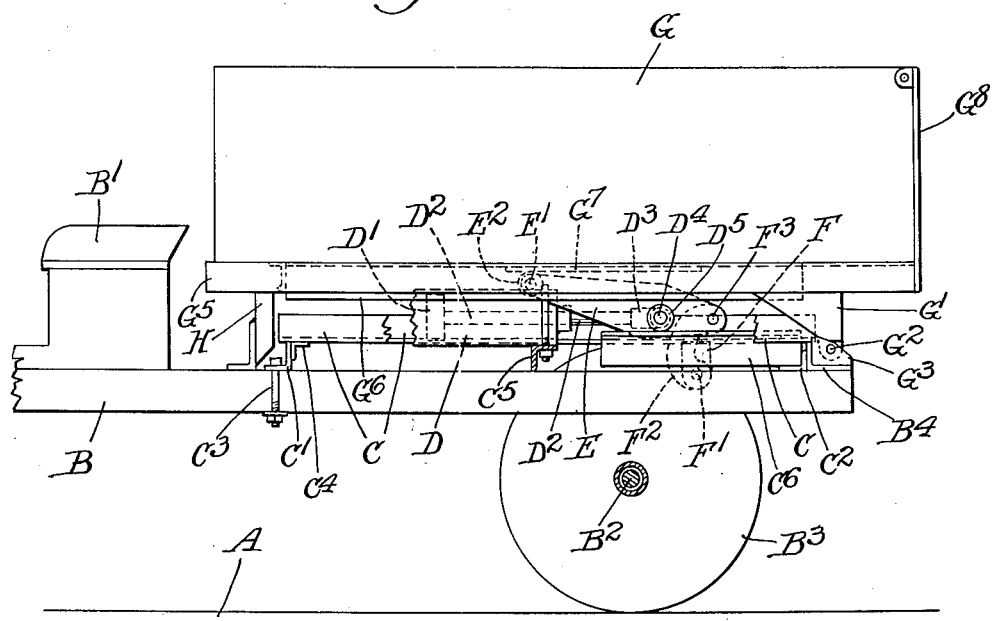
Figure 1 is a side elevation of a dumping body in position on an automobile, with parts broken away and parts in section.

The use and operation of my invention are as follows:

With the parts in the position shown in full lines in Figure 1, the body may be loaded. Usually it is moved from the place where it is loaded to some other location where its load is to be discharged. To accomplish this, the body is tipped. It is for this purpose that the tipping mechanism is provided. When it is desired to tip the body, the mechanism is manipulated, either hydraulically or otherwise, to move the cross head D³ from the position shown in full lines in Figures 1, 2 and 3, rearwardly to a position shown in dotted lines in Figure 3. In the form shown, of course, an hydraulic cylinder is used to accomplish the rearward movement of the cross head. Obviously, however, this might be accomplished otherwise.

As the cross head moves rearwardly, it carries with it the levers E. Since the movement of the ends of these levers is limited by the links F², they cannot move freely rearwardly, but move through an arc, downwardly, as they move rearwardly. They are thus caused to pivot or rotate about the shaft D⁴ of the cross head, and as the full movement of the cross head is accomplished, the levers are tilted from the more or less horizontal position as shown in full lines in Figures 1 and 3, to the more or less vertical position shown in dotted lines in Figure 3. In this movement the levers bearing against the bottom of the receptacle tilt it upwardly as indicated in Figure 3. During the major portion of the movement of the levers, the shaft F³ which fastens the lower ends of the levers to the links F², lies in the upper or outer end of the slots F⁴. At approximately the upper limit of its movement, the receptacle tends to tilt rearwardly, by gravity, and thus, in effect, will run away from the levers which have thus far forced it upwardly. When this occurs, the raising effect of the cross head is no longer felt and whether it continues or not, the body moves further in the tilting direction and in so moving, tends to run away from the rollers which are carried by the levers E. Therefore, in effect, the body "snaps" rearwardly for the last portion of its movement. In doing so, it carries the levers E with it and thus the shaft F³ is moved from the upper or outer ends of the slots F⁴, which position it occupies as shown in full lines in Figure 3, to the lower or inner ends of the slots F⁴, which position is indicated in dotted lines in Figure 3. By providing the slots F⁴, the length of the connection between the supporting frame of the vehicle and the end of the levers E may be definitely lengthened and shortened, and this causes a final snap or jerk at or near the end of the dumping movement of the receptacle. Such snap or jerk is valuable and important as a means for jerking the contents of the receptacle, which tends thus to assist in the dumping of sticky or adhesive material or material which for any reason is difficult to free from the receptacle. If a single snap or jerk is not sufficient to free the load from the body, the dumping mechanism may be manipulated to cause the body to move downward slightly from the full dumped position, and then to cause it to move again to the full dumped position. This may be repeated as often as necessary to cause a succession of jerks or snaps of the receptacle, thereby insuring a satisfactory dump of the load.

After the load has been successfully dumped, the raising mechanism is reversed so that the cross head is returned toward the full line position of Figure 3. With this movement, the levers are returned toward their full line position of that figure, and the body rotates downwardly toward the loading position. When the body is returned to the full line position of Figure 3, the dumping cycle is complete and will ordinarily not be repeated until a new load has been taken and until it is desired to dump that load.

I claim:

1. In combination in a dumping body, a support, a body mounted thereon for motion with respect thereto, a movable pivot member, means for moving it, levers pivoted intermediate their ends on said pivot member and links attached each at one end upon said support and attached each at its other end to an end of one of said levers, there being a shifting pivotal connection between said links and said levers, said pivotal connection including means to cause relative shifting in addition to relative pivoting of the links and levers.

2. In combination in a dumping body, a support, a body mounted thereon for motion with respect thereto, a movable pivot member, means for moving it, levers pivoted intermediate their ends on said pivot member and links attached each at one end upon said support and attached each at its other end to an end of one of said levers, there being a shifting pivotal connection between said links and said levers, said pivotal connection including means to cause relative shifting in addition to relative pivoting of the links and levers, whereby the effective radius of movement of one end of each of said levers is varied during its tilting movement.

3. In combination in a dumping body, a support, a body mounted thereon for motion with respect thereto, a movable pivot member, means for moving it, levers pivoted intermediate their ends on said pivot member and links attached each at one end upon a fixed pivot point on said support and attached each at its other end to an end of one of said levers, there being a shifting pivotal connection between said links and said levers, said pivotal connection including means to cause relative shifting in addition to relative pivoting of the links and levers.

4. In combination in a dumping body, a support, a body mounted thereon for motion with respect thereto, a movable pivot member, means for moving it, levers pivoted intermediate their ends on said pivot member and links attached each at one end upon a fixed pivot point on said support and attached each at its other end to an end of one of said levers, there being a shifting pivotal connection between said links and said levers, said pivotal connection including means to cause relative shifting in addition to relative pivoting of the links and levers, whereby the effective radius of movement of one end of each of said levers is varied during its tilting movement.

5. In combination in a dumping body, a frame, a body mounted thereon for motion with respect thereto, a movable pivot member, means for moving it, rollers on said member, tracks on said frame upon which said rollers move, levers pivoted intermediate their ends on said pivot member, and links attached each at one end upon said frame and attached each at its other end to an end of one of said levers, there being a shifting pivotal connection between said links and said levers, said pivotal connection including means to cause relative shifting in addition to relative pivoting of the links and levers.

6. In combination in a dumping body, a frame, a body mounted thereon for motion with respect thereto, a movable pivot member, means for moving it, rollers on said member, tracks on said frame upon which said rollers move, levers pivoted intermediate their ends on said pivot member, and links attached each at one end upon said frame and attached each at its other end to an end of one of said levers, there being a shifting pivotal connection between said links and said levers, said pivotal connection including means to cause relative shifting in addition to relative pivoting of the links and levers, whereby the effective radius of movement of one end of each of said levers is varied during its tilting movement.

7. In combination in a dumping body, a frame, a body mounted thereon for pivotal motion with respect thereto, a movable pivot member, means for moving it, rollers on said member, tracks on said frame upon which said rollers move, levers pivoted intermediate their ends on said pivot member, and links attached each at one end upon a fixed pivotal point on said frame and attached each at its other end to an end of one of said levers, there being a shifting pivotal connection between said links and said levers, said pivotal connection including means to cause relative shifting in addition to relative pivoting of the links and levers, whereby the effective radius of movement of one end of each of said levers is varied during its tilting movement.

8. In combination in a dumping body, a frame, a body mounted thereon for pivotal motion with respect thereto, a movable pivot member, means for moving it, rollers on said member, tracks on said frame upon which said rollers move, tracks on said body, levers pivoted intermediate their ends on said pivot member, rollers on one end of said levers adapted to engage and run in the tracks on said body, and curved links attached each at one end upon a fixed pivotal point on said frame and attached each at its other end to an end of one of said levers, there being a shifting pivotal connection between said links and said levers, said pivotal connection including means to cause relative shifting in addition to relative pivoting of the links and levers, whereby the effective radius of movement of one end of each of said levers is varied during its tilting movement.

9. In combination in a dumping body, a support, a body mounted thereon for pivotal movement with respect thereto, a moving pivot member mounted to move along said support, means for moving it, levers pivoted upon said member, adapted at one end to bear against said body, and means for attaching the opposite ends of said levers to said support, said means including links pivoted to said support, said links being joined to said levers with a sliding pivotal connection.

10. In combination in a dumping body, a support, a body mounted thereon for pivotal movement with respect thereto, a moving pivot member mounted to move along said support, means for moving it, levers pivoted upon said member, adapted at one end to bear against said body, and means for attaching the opposite ends of said levers to said support, said last mentioned means including links pivoted to said support, provided with slots in their opposite ends, and engaging at said slots the ends of said levers.

11. In combination in a dumping body, a support, a body mounted thereon for pivotal movement with respect thereto, a moving pivot member mounted to move along said support, means for moving it, levers pivoted upon said member, adapted at one end to bear against said body, and means for attaching the opposite ends of said levers to said support, said means including links pivoted to said support, said links being attached to said levers and comprising a slotted connection between the ends of said levers and said support, of varying length.

12. In combination in a dumping body, a support, a body mounted thereon for pivotal movement with respect thereto, a moving pivot member mounted to move along said support, means for moving it, levers pivoted upon said member, adapted at one end to bear against said body, and means for attaching the opposite ends of said levers to said support, said means including links pivoted to said support, means to provide a jerking action for said levers, said links being pivoted to said levers with a shifting pivotal connection, said pivotal connection including means to cause relative shifting in addition to relative pivoting of the links and levers.

13. In combination in a dumping body, a support, a body mounted thereon for dumping movement with respect thereto, means for dumping the body, including levers, means for moving them to dump the body, a moving pivot member for said levers, connections of varying length connecting said levers to said support, said connections including links pivoted to the support and pivoted to the levers with a shifting pivotal connection, said pivotal connection including means to cause relative shifting in addition to relative pivoting of the links and levers.

14. In combination in a dumping body, a support, a body mounted thereon for dumping movement with respect thereto, means for dumping the body, including levers, means for tilting them to dump the body, a moving pivot member for said levers, connections of varying length connecting said levers to said support, said connections including links pivoted to the support and pivoted to the levers with a shifting pivotal connection, said pivotal connection including means to cause relative shifting in addition to relative pivoting of the links and levers.

15. In combination in a dumping body, a support, a body mounted thereon for dumping movement with respect thereto, means for dumping the body, and for jerking it at approximately the end of its tilting movement, including levers, means for moving them to dump the body, a moving pivot member for said levers, connections of varying length connecting said levers to said support, said connections including links pivoted to the support and pivoted to the levers with a shifting pivotal connection, said pivotal connection including means to cause relative shifting in addition to relative pivoting of the links and levers.

Signed at Streator county of La Salle and State of Illinois, this 21st day of March, 1931.

WILLIAM C. ANTHONY.